Patented Jan. 4, 1944

2,338,231

UNITED STATES PATENT OFFICE 2,338,231

ALDEHYDE REACTION PRODUCT OF STYRENE AND A POLYMER

Solomon Caplan, New York, N. Y., and William F. Schaufelberger, Irvington, N. J., assignors to The Harvel Corporation, a corporation of New Jersey No Drawing. Application February 6, 1943, Serial No. 475,056

20 Claims. (Cl. 260—42)

The present invention relates to novel compositions of matter and to methods and steps of making the same as well as to applications of these compositions. In one of its specific aspects the invention is directed to novel compositions of matter produced with styrene, liquid polymers of the liquids derived from the *Anacardiaceae* family of plants and an aldehyde.

Styrene $C_6H_5CH:CH_2$ is an oily liquid which at room temperature is soluble in benzol and which will polymerize at room temperature to a solid, metastyrene, which is brittle, has poor dimensional stability characteristics, and is soluble in benzol. One of the outstanding characteristics of solid polymerized styrene, known as metastyrene, is its extremely low power factor loss and constancy of this characteristic over a wide range of temperatures. This electrical characteristic makes polymerized styrene especially suitable as an insulating material. However, in many instances it is not practical to use the same alone because of its high brittleness characteristic particularly in film form, and its cold flow (poor dimensional stability).

Essentially this invention is directed to the novel methods of reacting an aldehyde with a solution of styrene and a polymer of cashew nut shell liquid, marking nut shell liquid or Japanese lac, to produce novel compositions of matter which are insoluble in benzol, are substantially infusible solids and have high electrical insulating properties and are of a flexible rubbery nature.

In the course of our experimentations, we have discovered that the purposes of the present invention are adequately served by a certain type of liquid polymer which may be readily produced. And these polymers, which serve the purpose of this invention, are those liquid polymers produced by heating cashew nut shell liquid, marking nut shell liquid or Japanese lac or any mixture of two or more of them in the presence of a polymerizing agent. These catalytic polymerizing agents are well known and include the mineral acids such as sulphuric acid, hydrochloric acid and phosphoric acid, salts of mineral acids which produce an acid reaction on hydrolysis such as zinc chloride, stannous chloride, phosphorous oxy-chloride and aluminum chloride as well as the alkyl esters such as the alkyl esters of sulphuric acid, such as diethyl sulphate, alkyl esters of phosphoric acid such as tributyl phosphate.

The following Examples 1 to 5 are given as illustrations of the particular methods which may be followed in producing the polymers of cashew nut shell liquid. In place of the cashew nut shell liquid employed in Examples 1 to 5, marking nut shell liquid or Japanese lac may be substituted, and of course the other polymerizing agents may be used in place of the specific ones described therein.

Example 1

| | |
|---|---|
| Treated cashew nut shell liquid____pounds__ | 200 |
| Concentrated sulphuric acid_____do____ | 3 |
| Alcohol _____gallons__ | 2½ |

The sulphuric acid is dissolved in the alcohol and this solution is added to the cashew nut shell liquid. This mixture is heated while being agitated and the heat supply is temporarily cut off when the mixture has attained a temperature of about 330° F. An exothermic action ensues which will increase the temperature to about 360° F. until a sample removed and cooled and then diluted with an equal volume of xylene shows a viscosity at 25° C. of between 40 and 150 centipoises. The mass is then allowed to cool to room temperature. The viscosity of the polymer so produced will generally increase during the cooling period so that its viscosity will be between 50 and 200 centipoises when tested at 25° C. in solution with an equal weight of xylene.

Example 2

| | Pounds |
|---|---|
| Treated cashew nut shell liquid_____ | 400 |
| Diethyl sulphate_____ | 5 |

The diethyl sulphate is dissolved in the cashew nut shell liquid which is then heated to about 330° F. while being agitated and the heat supply is temporarily cut off when this temperature is reached. An exothermic action ensues which will carry the temperature to about 360° F. The mass is held at this temperature of about 360° F. until a sample removed shows a viscosity at 25° C. of between 40 and 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Example 3

| | Pounds |
|---|---|
| Cashew nut shell liquid_____ | 400 |
| Concentrated hydrochloric acid (sp. gr. 1.20) _____ | 24 |
| Concentrated sulphuric acid_____ | 1 |
| Water _____ | 15 |

This mixture is emulsified by vigorous agitation and then heated under a reflux condenser to about 110° C. for about 2½ hours. The emulsion is then removed to an open kettle and the temperature is increased to 200° C. and held at this temperature until a sample diluted with an equal weight of xylene shows a viscosity at 25° C. of between 40 and 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Example 4

Treated cashew nut shell liquid is mixed with about 5% of its weight of tributyl phosphate. The mixture is then heated to 500° F. and held at this temperature until a sample diluted with an equal weight of xylene shows a viscosity at 25° C. of 40 to 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Example 5

To treated cashew nut shell liquid is added 10% of its weight of zinc chloride dissolved in an equal weight of alcohol. This mixture is then heated gradually to a temperature of about 350° F. and held at this temperature until a sample diluted with an equal weight of xylene shows at 25° C. a viscosity of 40 to 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Following the preparation of said liquid polymers selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises, said polymers are dissolved in monomeric styrene to provide a solution in which the ratio of the quantity by weight of said styrene to the quantity by weight of said polymer is preferably between about 1 to 4 and 4 to 1. Then to said solution is added an aldehyde, which aldehyde is reacted therewith to provide an infusible, rubbery, solid product substantially insoluble in benzol and having high electrical insulation properties. The aldehydes which are preferable are formaldehyde, paraformaldehyde, trioxymethylene, furfuraldehyde, and hexamethylene tetramine. With the exception of hexamethylene tetramine, when any one or a mixture of two or more of the above are employed, the reaction may be carried out at room temperature. However, when hexamethylene tetramine is the only aldehyde used, the temperature of the solution and this particular aldehyde should be elevated to between about 185° F. and 250° F.

The following examples, 6, 7, 8, 9, 10 illustrate the manner of producing the novel compositions.

Example 6

About 60 parts by weight of a polymer made in accordance with method set forth in Examples 1 to 5 is dissolved in about 40 parts by weight of monomeric styrene. Then about 5 parts by weight of powdered paraformaldehyde is added to said solution and this mixture is stirred to uniformly distribute said finely divided paraformaldehyde throughout said solution. After remaining for about three hours at room temperature, said mixture will have gelled or solidified to a non-flowing rubbery flexible state and after an extended period of time, such as a year, will be found to be in the same condition. If a portion of this material, which has been left standing for about 9 months at room temperature is baked at 100° C., its volatile losses will be found to be less than 10% and after the baking operation at this temperature will still retain a degree of its flexibility characteristic.

Example 7

In Example 6, the quantity of paraformaldehyde may be between about 1% to 10% of the amount polymerized cashew nut shell liquid employed. In this example, furfuraldehyde replaces the paraformaldehyde of Example 6, but in all other respects is the same as Example 6 except that when furfuraldehyde is employed the quantity thereof is between 5% to 20% of the quantity of said polymerized cashew nut shell liquid.

Example 8

Between about 20 to 80 parts of said polymerized cashew nut shell liquid of Examples 1–5 is dissolved in about between 80 to 20 parts of monomeric styrene and to this solution is added between about 1 to 10 parts of trioxymethylene which is uniformly distributed therethrough by stirring. After being allowed to stand for about twenty-four to seventy-two hours at room temperature, this mass will have been converted to a gel or solid infusible resin of a flexible rubbery nature.

Example 9

Between about 20 to 80 parts of said polymerized cashew nut shell liquid of Examples 1–5 is dissolved in between about 20 to 80 parts of monomeric styrene and to this solution is added about 5 to 8 parts of hexamethylene tetramine which is uniformly distributed therethrough by stirring. This mass is heated at between about 180° F. to 250° F. for about one-half to two hours to convert the same to a solid infusible resin of a flexible rubbery nature and of high electrical insulation properties and being substantially insoluble in benzol.

Example 10

Between 20 and 80 parts of said polymerized cashew nut shell liquid of Examples 1 to 5 is dissolved in about 80 to 20 parts of monomeric styrene and to this solution is added a mixture of about 5 parts of hexamethylene tetramine and about 1 to 2 parts of formaldehyde, paraformaldehyde, trioxymethylene or furfuraldehyde, which mixture is uniformly distributed throughout said solution by agitation or stirring. This mass is allowed to stand for about 24 hours after which it will be found to have solidified sufficiently to allow same to be molded and shaped. After this molding and shaping operation, it is subjected to an elevated temperature of about 185° F. to 250° F. for about one-half to two hours. The resultant product is a solid infusible rubbery resin having high electrical properties and being substantially insoluble in benzol.

The mixtures of the aldehyde and the solution of the polymer and styrene as set forth in Examples 6 to 9 may be converted to the solid rubbery state much more quickly by heating the mixture to elevated temperatures of between about 50° C. to 100° C. instead of allowing the reaction to proceed at room temperature.

The term treated cashew nut shell liquid which has been employed in Examples 1, 2, 4 and 5 refers to a treatment of the raw cashew nut shell liquid for the reduction in the content of vesicant agent normally occurring in said raw product. Such treatment has been described in the Harvey-Damitz Patent No. 2,128,247. In place of the treated cashew nut shell liquid, the raw or untreated cashew nut shell liquid may be employed for the purposes of this invention. In all of the examples herein where cashew nut shell liquid is specifically set forth, we may substitute marking nut shell liquid, or Japanese lac.

The products of this invention have a wide variety of uses among which are the following: They may be used as coating materials for fabrics, asbestos and the like; impregnating material for porous, woven or felt fabrics; as an insulation material which may be applied directly to the conductor to be insulated, may be carried by a base, or may be used between a sheath cable for the same purpose.

The method which we prefer to employ for the above applications is to use the mixture of the styrene-polymer solution and aldehyde in its free flowing form to impregnate or coat and thereafter allow the reaction to proceed either at room temperature or at elevated temperatures to convert the mixture to a solidified substantially infusible, rubbery, flexible material which is insoluble in benzol. However, it is within the purview of this invention to convert said mixture to said state and thereafter employ the same either in bulk or shredded or comminuted form. Still another method which may be employed is to first convert said mixture to an initial state and thereafter the solidified material is extruded, sheeted or calendered to the desired thickness and shape after which the reaction is advanced to the final state.

This application is a continuation in part of our copending application Serial No. 468,984, filed December 14, 1942.

We claim:

1. The method of producing a substantially infusible solid material substantially insoluble in benzol comprising reacting an aldehyde selected from the group consisting of formaldehyde, paraformaldehyde, furfuraldehyde, trioxymethylene and hexamethylene tetramine with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises.

2. The method of producing a substantially infusible solid material substantially insoluble in benzol comprising reacting an aldehyde selected from the group consisting of formaldehyde, paraformaldehyde, furfuraldehyde, trioxymethylene and hexamethylene tetramine with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

3. The method of producing a substantially infusible solid material substantially insoluble in benzol comprising reacting an aldehyde selected from the group consisting of formaldehyde, paraformaldehyde, furfuraldehyde, trioxymethylene and hexamethylene tetramine with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centopoises.

4. The method of producing a substantially infusible solid material substantially insoluble in benzol comprising reacting an aldehyde selected from the group consisting of formaldehyde, paraformaldehyde, furfuraldehyde, trioxymethylene and hexamethylene tetramine with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

5. A substantially infusible solid material substantially insoluble in benzol and obtained by reacting an aldehyde selected from the group consisting of formaldehyde, paraformaldehyde, furfuraldehyde, trioxymethylene, and hexamethylene tetramine with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises.

6. A substantially infusible solid material substantially insoluble in benzol and obtained by reacting an aldehyde selected from the group consisting of formaldehyde, paraformaldehyde, furfuraldehyde, trioxymethylene and hexamethylene tetramine with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises.

7. A substantially infusible solid material substantially insoluble in benzol and obtained by reacting an aldehyde selected from the group consisting of formaldehyde, paraformaldehyde, furfuraldehyde, trioxymethylene and hexamethylene tetramine with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

8. A substantially infusible solid material substantially insoluble in benzol and obtained by reacting an aldehyde selected from the group consisting of formaldehyde, paraformaldehyde, furfuraldehyde, trioxymethylene and hexamethylene tetramine with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises, the ratio of the quality of said styrene by weight to that of said polymer being between about 1 to 4 and 4 to 1.

9. An electrical insulating composition comprising a substantially infusible solid material obtained by reacting an aldehyde selected from the group consisting of formaldehyde, paraformaldehyde, furfuraldehyde, trioxymenthylene and hexamethylene tetramine with a solution of monomeric styrene and a polymer selected from the group consisting of cashew nut shell liquid, making nut shell liquid and Japanese lac polymerized to such a degree by heat in the presence of a polymerizing agent that a solution thereof with an equal weight of xylene has a viscosity at 25° C. of between about 40 and 200 centipoises.

10. An electrical insulating composition comprising a substantially infusible solid material obtained by reacting an aldehyde selected from the group consisting of formaldehyde, paraformaldehyde, furfuraldehyde, trioxymethylene and hexamethylene tetramine with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

11. An electrical insulating composition comprising a substantially infusible solid material obtained by reacting an aldehyde selected from the group consisting of formaldehyde, paraformaldehyde, furfuraldehyde, trioxymethylene and hexamethylene tetramine with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises.

12. An electrical insulating composition comprising a substantially infusible solid material obtained by reacting an aldehyde selected from the group consisting of formaldehyde, paraformaldehyde, furfuraldehyde, trioxymethylene and hexamethylene tetramine with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

13. A substantially infusible solid material obtained by reacting paraformaldehyde with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises.

14. A substantially infusible solid material obtained by reacting furfuraldehyde with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises.

15. A substantially infusible solid material obtained by reacting paraformaldehyde with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

16. A substantially infusible solid material obtained by reacting paraformaldehyde with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises.

17. A substantially infusible solid material obtained by reacting paraformaldehyde with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

18. A substantially infusible solid material obtained by reacting furfuraldehyde with a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

19. A substantially infusible solid material obtained by reacting furfuraldehyde with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises.

20. A substantially infusible solid material obtained by reacting furfuraldehyde with a solution of monomeric styrene and a polymer of cashew nut shell liquid polymerized to such a degree by heat in the presence of a polymerizing agent that a solution thereof with an equal weight of xylene has a viscosity at 25° C. of between about 40 and 200 centipoises, the ratio of the quantity of said styrene by weight to that of said polymer being between about 1 to 4 and 4 to 1.

SOLOMON CAPLAN.
WILLIAM F. SCHAUFELBERGER.